United States Patent [19]

Miller

[11] Patent Number: 4,568,083
[45] Date of Patent: Feb. 4, 1986

[54] GAME BALL

[76] Inventor: Richard E. Miller, 6119 Cowan Mill Rd., Douglasville, Ga. 30135

[21] Appl. No.: 441,566

[22] Filed: Nov. 15, 1982

[51] Int. Cl.⁴ .............. B29C 27/08; B29C 24/00; A63B 37/00
[52] U.S. Cl. .................. 273/60 B; 273/DIG. 22; 273/DIG. 5; 264/248; 156/73.5; 156/292
[58] Field of Search ........ 273/58 B, 58 BA, DIG. 20, 273/235 R, 60 R, 60 A, 60 B, 218, DIG. 11, DIG. 22, DIG. 4; 264/248, 255, 524; 156/73.5, 292, 73.1

[56] References Cited

U.S. PATENT DOCUMENTS

| | | | |
|---|---|---|---|
| 1,580,230 | 4/1926 | Brereton | 273/58 BA X |
| 3,102,362 | 9/1963 | Neal | 273/58 B X |
| 3,534,965 | 10/1970 | Harrison et al. | 273/DIG. 4 |
| 3,652,088 | 3/1972 | Marsh | 273/DIG. 4 |
| 3,819,768 | 6/1974 | Molitor | 273/235 R X |
| 3,940,145 | 2/1976 | Gentiluomo | 273/218 |
| 3,940,146 | 2/1976 | Little | 273/DIG. 4 |
| 4,003,574 | 1/1977 | MacDonald et al. | 273/65 EC |
| 4,211,407 | 7/1980 | Tomar | 273/DIG. 11 X |
| 4,248,424 | 2/1981 | Judkins | 273/60 B |
| 4,274,637 | 6/1981 | Molitor | 273/235 R |
| 4,367,873 | 1/1983 | Chang et al. | 273/60 R |

FOREIGN PATENT DOCUMENTS

| | | | |
|---|---|---|---|
| 0037461 | 3/1982 | Japan | 273/58 BA |
| 2085885 | 5/1982 | United Kingdom | 273/DIG. 20 |

Primary Examiner—George J. Marlo
Attorney, Agent, or Firm—James B. Middleton

[57] ABSTRACT

A baseball or softball having a size, weight, sound and rebound in accordance with standards set for the game. The ball is formed of a spherical plastic shell covered with a conventional sewn cover. The plastic shell is a thermoplastic consisting of a mixture of "Surlyn" ionomer with about 50% ethylene vinyl acetate. The proportions are variable to achieve the desired characteristics, the "Surlyn" providing strength and sound while the EVA provides softness and ease of thermo-welding. The shell is made by injection molding hemispheres and thermally welding two hemispheres together. As an alternative, the shell can be formed with a hole, and liquid components of an expanded plastic placed into the shell and expanded to fill the shell. The shell still provides all characteristics desired, and the expanded plastic is for weight only.

3 Claims, 8 Drawing Figures

GAME BALL

FIELD OF THE INVENTION

This invention relates generally to game balls, and is more particularly concerned with a baseball or softball formed of a plastic sphere and having a conventional cover directly over the sphere.

BACKGROUND OF THE INVENTION

For many years, game balls such as baseballs and softballs have been formed by providing a spherical core of cork, kapok or other such material, placing a winding of string or yarn over the core to provide strength and resilience, and sewing a cover of leather or the like over the windings.

Many problems with these prior art balls have long been recognized. The balls vary widely in size and weight so that many balls are rejected. If the size is too far from standard a cover will not fit, and if the weight is too far from standard it will be unacceptable to the players. The prior art balls also tend to have a short playing life. The cover and windings may split from normal play, or the ball may become so badly non-spherical that playing characteristics are unacceptable. Additionally, the prior art balls will soak up water when exposed to wet, or even damp, conditions. When the ball becomes water-soaked, the weight of the ball is greatly increased and the resilience of the ball is decreased.

With the vast technology in plastic materials, there have been several balls formed of foamed plastics. These have taken the form of a molded sphere of expanded plastic material, the sphere being covered by the conventional leather cover, with or without an intermediate winding of string. These balls also have not met with great success. A ball made of ethylene vinyl acetate (EVA) has been attempted, but the coefficient of restitution of the ball is too great, which is to say the ball rebounds better than is desired. When hit by a baseball bat, the EVA ball travels so fast as to be a distinct danger to players. Also, when the EVA ball is cold, the ball becomes so dense as to bend a metal bat. A similar ball has been made of a cross-linked polyurethane, and this ball has been found to be affected by changes in climate so that the ball is not consistent. The polyurethane ball tends to take a compression set so that the sphericity is not guaranteed during play.

As a result of the above mentioned and other difficulties with the balls made of plastic, many of the balls in regular use are still made with the center of cork or the like covered by conventional string windings and the conventional leather cover.

SUMMARY OF THE INVENTION

The present invention overcomes the abovementioned and other difficulties in the prior art by providing a game ball formed of a single sphere of thermoplastic material, the sphere being thereafter covered by a conventional leather cover. In the preferred embodiment of the invention, the ball is made by molding hemispheres so that two hemispheres are very accurately formed. All dimensions, and the weight, are carefully controlled to produce the ball desired. After the hemispheres are molded, two hemispheres are welded together to form a single, unitary sphere. Since the hemispheres are made of a thermoplastic, it will be understood that any of numerous welding techniques can be used. In another form of the invention, the hemispheres may be molded and welded together, and a hole provided through the sphere so that the interior of the hollow sphere can be filled. In this form of the invention, the center of the sphere would be filled with a foamable material. The ball of the present invention therefore provides a sphere of plastic wherein the sphere has the desired toughness, the rebound qualities, and the sound required for a game ball. Also, a ball made in accordance with the present invention is extremely durable so that a single kind of ball can be used in any circumstances, whether in a professional ball game, on a batting range or the like, and the ball will maintain the same sound and resilience throughout its life.

BRIEF DESCRIPTION OF THE DRAWINGS

These and other features and advantages of the present invention will become apparent from consideration of the following specification when taken in conjunction with the accompanying drawings in which.

DESCRIPTION OF THE EMBODIMENTS OF THE INVENTION

Referring now more particularly to the drawings, and to those embodiments of the invention here presented by way of illustration, it will first be understood that the material from which the ball of the present invention is made is of some importance. Those skilled in the art will readily recognize that some plastics will be so soft and pliable that the rebound quality of the ball, or the coefficient of restitution, is insufficient to be acceptable as a game ball. Other plastics may be so hard that the sphere will simply shatter when impacted by a baseball bat in the normal play of the game. It has been found that one acceptable material for forming balls in accordance with the present invention is an ionomer such as "Surlyn" made by DuPont. The hemisphere such as those shown in FIG. 1 of the drawings may be molded entirely of "Surlyn" and a very acceptable ball can be formed. The difficulty with a ball of one hundred percent "Surlyn" is that the hemispheres are very difficult to weld together. The hemispheres can be welded using bead welding, but this is an extremely expensive technique, so the production costs are increased considerably.

Figure 1:
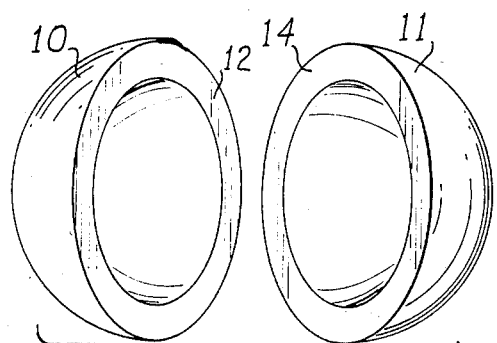
FIG. 1 is a perspective view showing two hemispheres for forming a ball in accordance with one embodiment of the present invention.

The hemispheres such as those shown in FIG. 1 may also be formed of one hundred percent ethylene vinyl acetate (EVA); however, the EVA gives a very high coefficient of restitution and produces a very dull sound, both of which are not acceptable. The advantage of using all EVA is that the hemispheres are relatively easy to weld together by conventional techniques for thermoplastics.

It has been found that the best ball in accordance with the present invention is made with a combination of "Surlyn" and EVA. The "Surlyn" primarily provides the toughness and durability of the ball, as well as the desired sound. The EVA in the mixture renders welding much easier, and makes the ball somewhat softer. It is therefore possible, using the present inventive concept, to produce a ball with the desired characteristics by raising or lowering the percentage of EVA in the "Surlyn". An increased EVA content gives a softer, more rubbery, feel to the ball, and dulls the sound, while a decreased EVA content makes the ball harder, more resilient, and produces a sharper sound when the ball is hit. In general, approximately 25% EVA in the mix provides a highly desirable ball, though a mix of approximately 50% EVA and 50% "Surlyn" yields a ball that will be most widely acceptable considering the sound, the coefficient of restitution and the durability.

With the foregoing in mind, FIG. 1 shows the two hemispheres that would conveniently be formed by injection molding or the like. The two hemispheres designated at 10 and 11 should be precisely alike and have a completely uniform wall thickness throughout. The uniform wall thickness is extremely important because, in the ball illustrated in FIGS. 1–4, the walls themselves provide the only substance to the ball. It will be understood by those skilled in the art, however, that techniques such as injection molding can provide hemispheres such as the hemispheres 10 and 11 to precise dimensions within very close tolerances.

Figure 2:
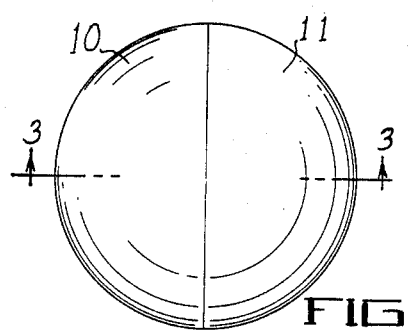
FIG. 2 is an elevational view showing the two hemispheres of FIG. 1 after the hemispheres have been welded together.

FIG. 2 of the drawings shows the hemispheres 10 and 11 after being welded together. The actual welding can be accomplished in many different ways including spin welding wherein one hemisphere will be held stationary while the other hemisphere is rapidly rotated while held in careful alignment with the stationary hemisphere. Sufficient heat is thereby generated to cause a true weld between the two hemispheres. Another common technique is to use thermo-welding wherein the edges 12 and 14 of the hemispheres 10 and 11 respectively are heated by engaging a heated platen, and the two hemispheres are then stuck together in proper alignment as shown in FIG. 2. Those skilled in the art will realize that these and other techniques for welding are known in the art, and any desired technique can be used.

Figure 3:
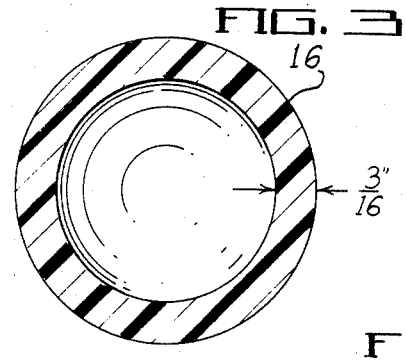
FIG. 3 is a cross-sectional view taken substantially along the line 3—3 in FIG. 2.

FIG. 3 of the drawing shows a cross-section of the ball shown in FIG. 2, the ball being illustrated after welding so that the ball shown in FIG. 3 is shown as an integral sphere. Looking at FIG. 3, it will be realized that the only means for changing the weight of this ball is by changing the wall thickness. It will be realized that the outside diameter, or circumference, of the ball will be standardized in accordance with the usual game rules so the outside diameter of the sphere cannot be changed in order to change the weight. With a ball made in accordance with the present invention, the shell as shown in FIG. 3 has sufficient strength that the wall thickness can be as small as approximately 1/32 inch, or about 0.8 mm. For the ball shown in FIGS. 1–4, such a wall thickness would provide a very light-weight ball; therefore, for this ball the wall thickness will normally be in the vicinity of 3/16 inch, or about 4.75 mm. Again, the wall thickness can be varied considerably to achieve the desired weight.

Figure 4:
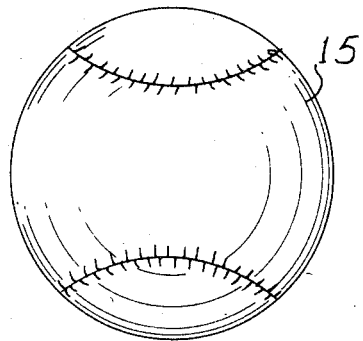
FIG. 4 is an elevational view showing the ball of FIGS. 1-3 after a cover has been sewn over the sphere.

FIG. 4 simply shows the ball of FIG. 3 after a cover has been sewn thereover, the cover being conventional in the art and well understood. It should be mentioned however that the ball of the present invention is sufficiently durable that, in extended play, the cover 15 of the ball may become worn. When the cover 15 is worn out, the underlying sphere 16 will be intact and can be re-covered, so the ball can be put back into play with less cost than the price of a completely new ball.

Figure 5:
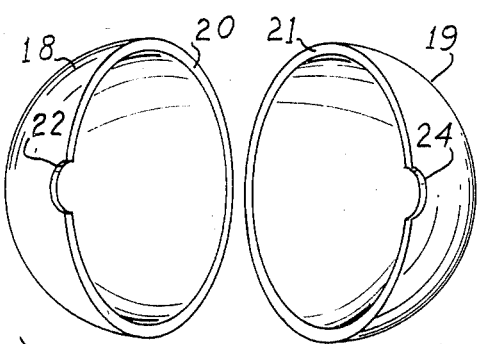
FIG. 5 is a perspective showing two hemispheres for forming a modified form of ball in accordance with the present invention.
Figure 6:
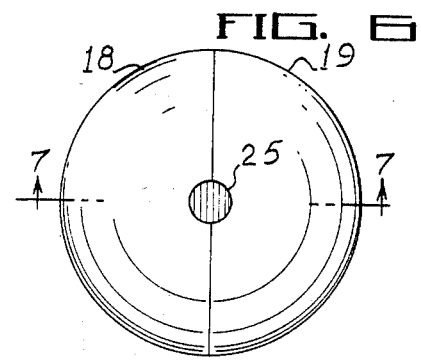
FIG. 6 is an elevational view showing a sphere after the hemispheres of FIG. 5 have been welded together.

Attention is next directed to FIG. 5 of the drawings which shows hemispheres 18 and 19 similar to the hemispheres 10 and 11. The hemispheres 18 and 19 have semicircular notches in their edges 20 and 21, the notches being indicated at 22 and 24. When the hemispheres 18 and 19 are welded together as shown in FIG. 6 of the drawings, it will be seen that a hole designated at 25 is formed. It will therefore be seen that the sphere shown in FIG. 6 is the same as the sphere shown in FIG. 2 except that the hole 25 allows some access to the interior of the sphere. The hemispheres will be welded together as discussed above in conjunction with the welding of the hemispheres 10 and 11.

Figure 7:
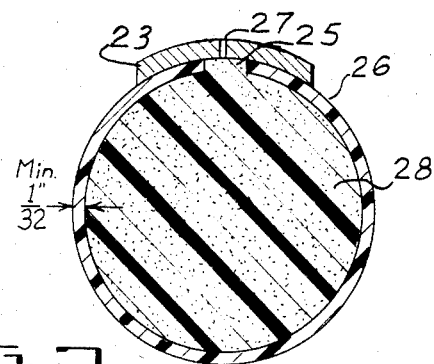
FIG. 7 is a cross-sectional view taken generally along the line 7—7 in FIG. 6 and showing the ball after the hollow sphere has been filled; and, FIG. 8 is an elevational view showing the ball of FIGS. 5-7 after a cover has been added.

Looking at FIG. 7 of the drawings, it will be noted that there are two differences between the sphere of FIG. 7 and the sphere of FIG. 3. In FIG. 7, the interior of the sphere 26 has been filled with an expanded plastic material designated at 28. This material has filled the entire interior of the sphere, and including the fill hole 25. The other difference is that the wall thickness of the sphere 26 is smaller than the wall thickness of the sphere 16.

In this embodiment of the invention, it is contemplated that the sphere 26 will be formed with the desired outside circumference, and the wall thickness of the sphere 26 can be made substantially uniform. The expanded plastic material 28 is then placed within the sphere 26 to add weight to achieve the desired final weight.

Because the expanded material 28 is for the sole purpose of adding weight, virtually any generally homogeneous material can be used. The only criterion would be that the material to be used must be in a form that can be fed through the fill hole 25, and foamed within the sphere 26 to fill the sphere. Those skilled in the art can readily ascertain the weight to be added, and calculate the quantity of material to be placed within the sphere 26. The blow ratio can be computed to cause the desired amount of material to fill the sphere 26.

One material contemplated as the foamed fill material is a cross-linked polyurethane. For this and numerous other foamable materials it will be realized that the foaming agent must be sufficient to cause the material to fill the entire sphere; and, to assure complete filling and homogeneity, a slight excess of gas is normally generated. The excess gas, then, must be allowed to escape to prevent the creation of voids within the sphere.

The general technique in filling the sphere 26 is to place the materials into the sphere 26 through the hole 25, then to cover the hole 25 with a template 23 having a vent hole 27. The template 23 can be held by appropriate clamps or the like well known to those skilled in the art.

While sizes will of course vary considerably, it must be kept in mind that the template 23 must be large enough to cover the hole 25 and allow space for clamping. The vent hole 27 is considerably smaller than the hole 25, the object being to allow the escape of excess gas while containing the solid material. A vent hole of about ⅛" has been found to be adequate, and the amount of solid material lost is around a couple of grams, and is therefore negligible.

Figure 8:
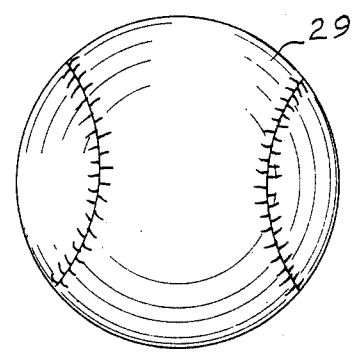

As in the previously described embodiment, after the sphere 26 has been filled with the material 28, the ball will be covered by a conventional sewn cover 29 as shown in FIG. 8 of the drawings.

It will therefore be understood that the present invention provides a game ball made of a plastic sphere, the sphere having the desired characteristics of the game ball, including the desired coefficient of restitution, the desired sound, and great durability. Furthermore, the ball will retain these same characteristics, including the same coefficient of restitution, for its entire life. Due to the method of forming the balls, it will be understood that the size of the balls will be uniform within very close tolerances. Also, the weight of the balls will be quite uniform, the weight and dimensions being such as to be calculated within close tolerances and repeated without detectable variation. In the case of improperly formed hemispheres, or balls that are rejected because of improper welding or the like, since the material is a thermoplastic, the material can be reground and recycled, so there is no wasted material.

It will be obvious that, in making a ball in accordance with the present invention, numerous additions to the "Surlyn" may be made. Virtually any plastic or the like may be added in very small quantities without changing the characteristics of the ball to a noticeable extent. Also, various fillers such as glass and the like may be added in small quantities. While glass may add some resilience to a ball, it has been found that the mixture of the "Surlyn" ionomer with a small amount of EVA produces a highly desirable ball that does not require fillers. The use of such fillers and other additives is, however, well within the scope of the present invention.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

I claim:

1. A game ball, for use in playing the game of baseball or softball wherein the ball is thrown to be hit with a bat, said ball having a size and a weight within the standards set by the rules of said game of baseball or softball, said game ball further producing a sound when hit by a bat such that said sound is acceptable to players of said game, said game ball comprising a hollow spherical shell and a conventional baseball or softball cover thereover, said spherical shell being formed of a thermoplastic material consisting of a mixture of an ionomer resin and ethylene vinyl acetate and having a wall of substantially three-sixteenths inch thickness, said shell further being of such size that said spherical shell with said cover thereover has a circumference within said standards set by the rules of said game, a weight within the standards set by the rules of said game, and a sound when hit acceptable to players of said game.

2. A game ball as claimed in claim 1, said mixture including at least 25% ethylene vinyl acetate.

3. A game ball as claimed in claim 1, said mixture comprising substantially 50% of said ionomer resin and 50% of said ethylene vinyl acetate.

* * * * *